(12) United States Patent
Zhang

(10) Patent No.: US 9,091,294 B2
(45) Date of Patent: Jul. 28, 2015

(54) SUCTION DISK STRUCTURE

(71) Applicant: Anho Houseware Co., Ltd. Jiangmen, Jiangmen, Guangdong (CN)

(72) Inventor: Decai Zhang, Guangdong (CN)

(73) Assignee: Anho Houseware Co., Ltd. Jiangmen, Jiangmen, Guangdong (CN)

( * ) Notice: Subject to any disclaimer, the term of this patent is extended or adjusted under 35 U.S.C. 154(b) by 0 days.

(21) Appl. No.: 14/007,964

(22) PCT Filed: Mar. 4, 2013

(86) PCT No.: PCT/CN2013/072120
§ 371 (c)(1),
(2) Date: Sep. 26, 2013

(87) PCT Pub. No.: WO2013/185493
PCT Pub. Date: Dec. 19, 2013

(65) Prior Publication Data
US 2014/0306083 A1    Oct. 16, 2014

(30) Foreign Application Priority Data

Jun. 15, 2012  (CN) .......................... 2012 2 0285179
Feb. 4, 2013   (CN) .......................... 2013 1 0044753

(51) Int. Cl.
*F16B 47/00*  (2006.01)
*A47G 1/17*   (2006.01)

(52) U.S. Cl.
CPC .. *F16B 47/00* (2013.01); *A47G 1/17* (2013.01)

(58) Field of Classification Search
CPC .................................. F16B 47/00; A47G 1/17
USPC .......... 248/205.8, 205.9, 206.1, 206.2, 205.5, 248/363, 683
See application file for complete search history.

(56) References Cited

U.S. PATENT DOCUMENTS 5,104,077 A * 4/1992 Liu ............................ 248/205.8
6,666,420 B1 12/2003 Carnevali
(Continued)

FOREIGN PATENT DOCUMENTS

CN    101265939 A    9/2008
CN    201125930 Y    10/2008
(Continued)

OTHER PUBLICATIONS

European Search Report, issued on Jul. 3, 2014, for European Patent Application No. 13765275.6 to Jiangmen Anho Houseware Co., Ltd., 6 pages.
(Continued)

*Primary Examiner* — Amy Sterling
(74) *Attorney, Agent, or Firm* — Faegre Baker Daniels LLP

(57) ABSTRACT

A suction disk structure including: a soft rubber suction disk (1) with a draw bar (11), a base (2) provided on a back face of the soft rubber suction disk (1) and a return spring (3) located between the soft rubber suction disk (1) and the base (2). Two sides of an end of the draw bar (11) is provided with a pin shaft (12) radially extended, and the suction disk further includes a driving device (4) for driving the draw bar (11) to rise and fall. The driving device (4) comprises a pushing switch (41) mounted on the base (2) and a driving slide cover (5) connected with the pushing switch. The pin shaft (12) can be driven to move up and down along the inclined step (43) at the center of the driving device, and the pin shaft (12) is moved up and down along the inclined step (43) and can be stopped on the upper and lower end supporting surfaces of the inclined step, respectively, thereby driving the draw bar (11) to rise and fall to drive the soft rubber suction disk, to thereby achieving an adsorption state and a release state. The pushing switch (41) can be easily pushed to the end to be is in a self-locking state, and the suction disk structure has a strong adsorption force and is easy to operate.

10 Claims, 19 Drawing Sheets

(56) References Cited

U.S. PATENT DOCUMENTS

| | | | |
|---|---|---|---|
| 6,932,306 B2 * | 8/2005 | Zou et al. | 248/205.5 |
| 7,455,269 B1 | 11/2008 | Chien et al. | |
| 8,356,781 B2 | 1/2013 | Chen et al. | |
| 8,496,222 B2 | 7/2013 | Li | |
| 2007/0210225 A1 | 9/2007 | Carnevali | |
| 2010/0252700 A1 | 10/2010 | Wang | |
| 2011/0210225 A1 | 9/2011 | Chen et al. | |

FOREIGN PATENT DOCUMENTS

| | | |
|---|---|---|
| CN | 201802741 U | 4/2011 |
| CN | 102072242 A | 5/2011 |
| CN | 202203267 U | 4/2012 |
| CN | 202756403 U | 2/2013 |
| CN | 203146556 | 8/2013 |
| EP | 1026981 B1 | 8/2003 |
| EP | 2434169 A1 | 3/2012 |
| FR | 2902474 | 12/2007 |
| JP | 48-30777 Y1 | 9/1973 |
| JP | 2001520065 | 10/2001 |
| JP | 2009-534617 A | 9/2009 |
| JP | 3163069 U | 9/2010 |
| KR | 20090017950 | 2/2009 |
| RU | 2105908 C1 | 2/1998 |
| RU | 116928 U1 | 6/2012 |
| SU | 735837 A | 5/1980 |
| TW | TWM387925U1 U1 | 9/1999 |
| TW | 201037180 A | 10/2010 |
| WO | WO2007123354 A1 | 11/2007 |
| WO | WO 2010110606 A2 | 9/2010 |
| WO | WO 2011025127 A2 | 3/2011 |
| WO | WO 2012/163411 | 12/2012 |

OTHER PUBLICATIONS

Design on Grant for Russian Application No. 2013145506, 13 pages, Mar. 4, 2013.

International Search Report and Written Opinion (in Chinese language) issued by the State Intellectual Property Office of the P.R. China, dated May 7, 2013, for related International Application No. PCT/CN2013/072120; 14 pages.

Taiwanese Office Action in application No. 102140613 and English summary of the same, May 25, 2015, (5 pages).

* cited by examiner

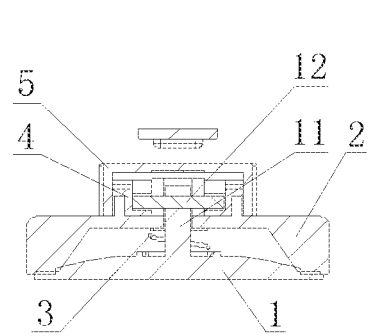
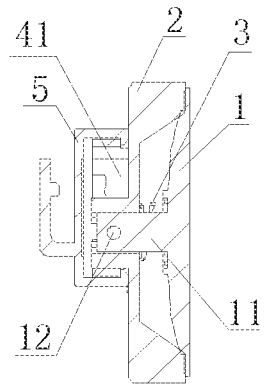
Fig.5
Fig.6
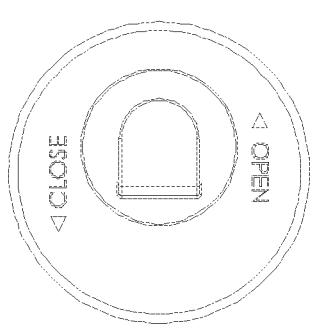
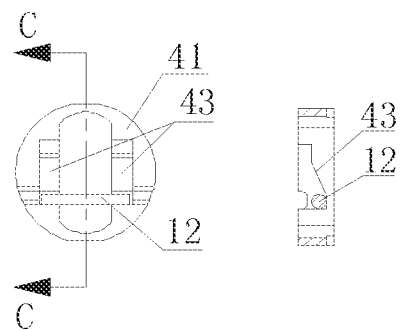
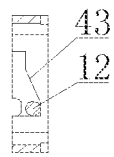
Fig.7
Fig.8
Fig.9

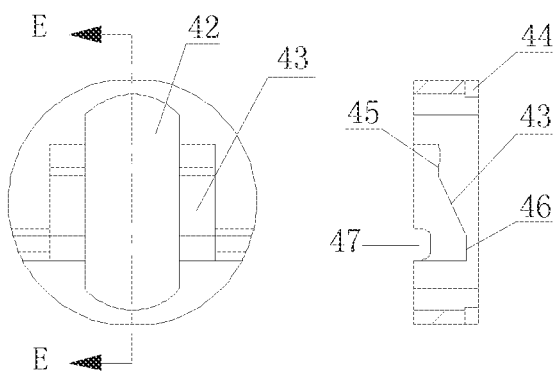
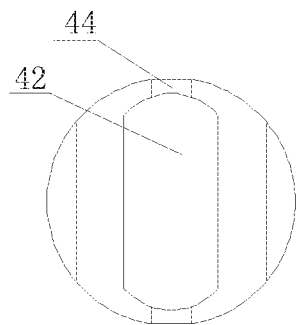
Fig.15
Fig.16
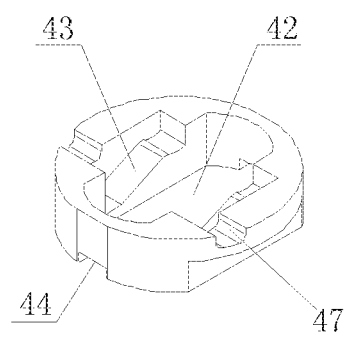
Fig.17
Fig.18

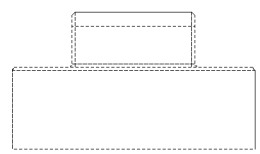
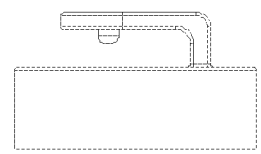
Fig.31  Fig.32
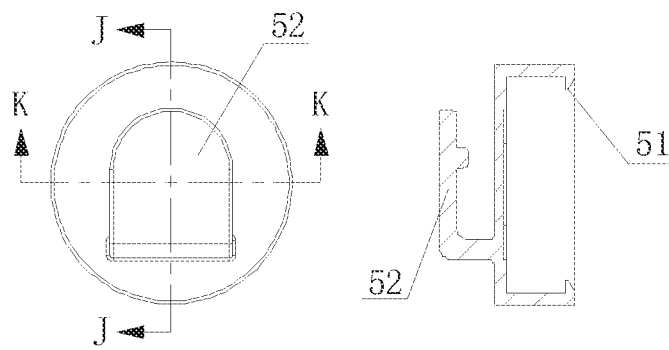
Fig.33  Fig.34
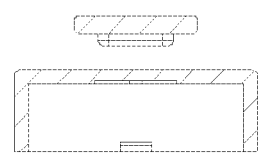
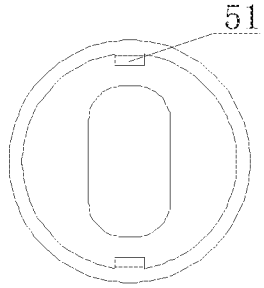
Fig.35  Fig.36

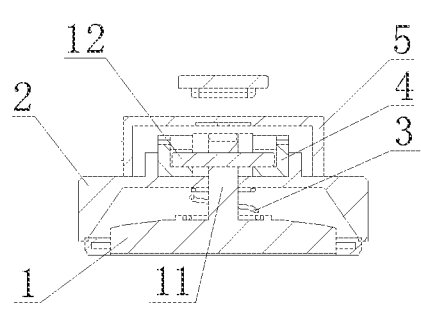
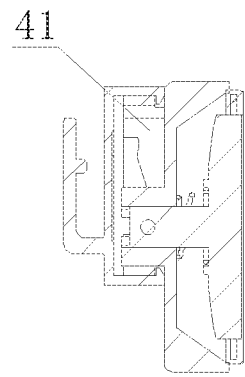
Fig.45
Fig.46
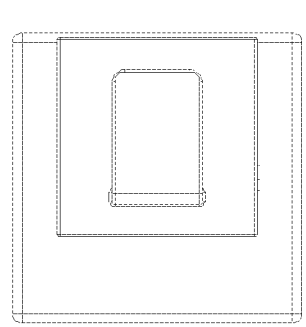
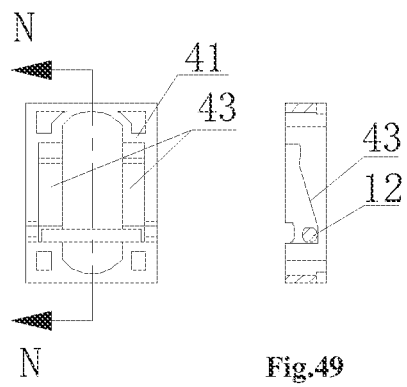
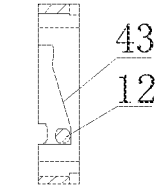
Fig.47
Fig.48
Fig.49

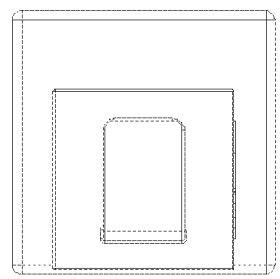
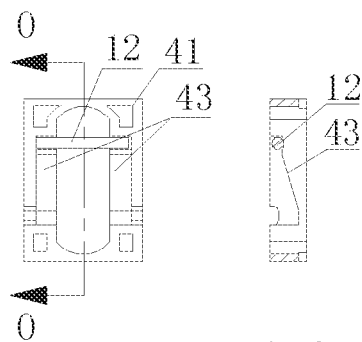
Fig.50　　　　Fig.51　　　　Fig.52
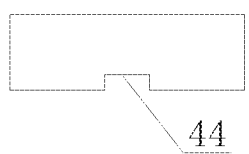
Fig.53　　　　Fig.54

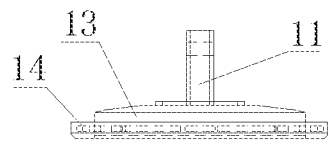
Fig.66
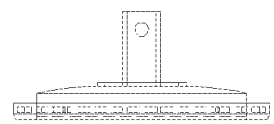
Fig.67
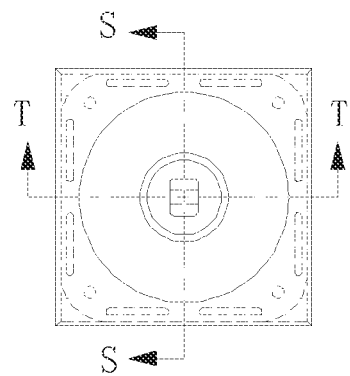
Fig.68
Fig.69
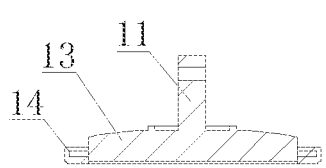
Fig.70
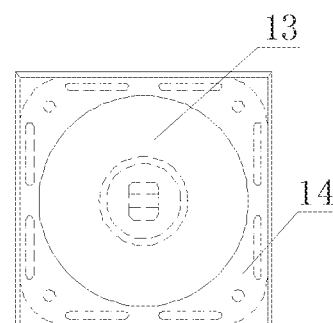
Fig.71

SUCTION DISK STRUCTURE

This application is the National Phase of International Application No. PCT/CN2013/072120 titled "SUCTION DISK STRUCTURE" filed on Mar. 4, 2013, which claims the benefit of priority to the following Chinese Patent Applications, the entire disclosures of which are incorporated herein by reference:

1) Application No. 201220285179.6 entitled "SUCTION DISK STRUCTURE" and filed with the Chinese State Intellectual Property Office on Jun. 15, 2012; and 2) Application No. 201310044753.8 entitled "SUCTION DISK STRUCTURE" and filed with the Chinese State Intellectual Property Office on Feb. 4, 2013.

FIELD OF THE INVENTION

The present application relates to a field of a suction cup for attaching, and in particular, to a suction disk structure.

BACKGROUND OF THE APPLICATION

The suction disk in the prior art has a simple structure and low cost, is easy to make, and is widely used in various fields. Especially, in our daily life, it is usually used to hang articles on the wall or the glass. One structure includes a soft rubber suction disk with a draw bar, a base provided on the back face of the soft rubber suction disk, and a return spring located between the soft rubber suction disk and the base, it further includes a driving device for driving the draw bar to rise and fall and a shell. The driving device is a rotary rise-fall driving device. The driving device may be a screw rise-fall driving device, and at this time, the draw bar is a screw. The driving device may also be a rotary ladder type rise-fall driving device, for example, the suction disk structures disclosed in Chinese Utility Model Application No. CN201020555276.3, titled "POWERFUL SUCTION DISK" and Chinese Patent Application No. CN201110006061.5, titled "VACUUM SEALED SUCTION DISK", at this time, each of the two sides of the draw bar has a pin shaft radially extended, and the pin shaft is driven to rise and fall by a rotary ladder support. Disadvantages of these structures are that: the structure is complex, large rotary force is required, the draw bar can not be moved up and down in position due to insufficient rotation, therefore the adsorption of the soft rubber suction disk is not tight or easy to get loosen, and thus the hung article is likely to fall off.

SUMMARY OF THE INVENTION

Based on the above, the technical problem to be solved according to the present application is to provide a suction disk structure which has a strong adsorption force and a long-term stable adsorption effect, and with this structure, it is not easy for the hung articles to fall off, and the operation is more convenient and easy.

In view of the above, it is provided according to the present application a suction disk structure including: a soft rubber suction disk (1) with a draw bar (11), a base (2) mounted on a back face of the soft rubber suction disk (1) and a return spring (3) located between the soft rubber suction disk (1) and the base (2). An end of the draw bar (11) is provided with a pin shaft (12) radially extended towards two sides of the draw bar (11). The suction disk further includes a driving device (4) for driving the draw bar (11) to rise and fall by pushing the pin shaft (12), among which:

a center of the base (2) has a central guiding hole (21) for guiding the draw bar (11) to move axially; a guiding column (23) having symmetrical guiding planes (22) at two sides of the guiding column and a pair of symmetrical position-limiting guiding flanges (24) are upwardly protruded around the central guiding hole (21), forming guiding grooves (25) between the guiding planes (22) and the position-limiting guiding flanges (24); the guiding column (23) further has a pin shaft rise-fall guiding groove (26) that is perpendicular to the symmetrical guiding planes (22) at two sides of the guiding column and extended along the axial direction, and two ends of the pin shaft (12) are hidden in the pin shaft rise-fall guiding groove (26);

the driving device (4) includes a pushing switch (41) mounted on the base (2) and a driving slide cover (5) connected with the pushing switch (41) and having a supporting member; the center of the pushing switch (41) has an elongate guiding hole (42), and each of two symmetrical sides of the elongate guiding hole (42) is provided with an inclined step (43) with an upper end supporting surface and a lower end supporting surface; and the pushing switch (41) is sleeved on the guiding column (23) through the elongate guiding hole (42) in a slideable cooperation manner such that the pushing switch (41) is guided in the guiding groove (25); and the draw bar (11) is extended through the central guiding hole (21) of the base (2) and a center of the pushing switch (41) such that two ends of the pin shaft (12) are simultaneously hidden in the inclined steps (43); as the pushing switch (41) is driven by the driving slide cover (5) to slide back and forth in a radial direction, the pin shaft (12) is moved up and down along the inclined step (43) and can be stopped on the upper and lower end supporting surfaces of the inclined step (43), respectively, thereby driving the draw bar (11) to rise and fall to drive the soft rubber suction disk (1), to thereby achieving an adsorption state and a release state.

Preferably, each of a front end and a back end of a bottom surface of the pushing switch (41) is formed with a recess (44), an internal wall of each of front and back bottom edges of the driving slide cover (5) is provided with a clasp (51), and the driving slide cover (5) is connected with the pushing switch (41) by self-locking snap fit of the clasp (51) and the recess (44).

Preferably, in the upper and lower end supporting surfaces of the inclined step (43), the upper end supporting surface (45) is a concave surface, and the lower end supporting surface (46) is a flat surface.

Preferably, the supporting member of the driving slide cover (5) is a flat square hook (52) bent upwardly.

Preferably, the soft rubber suction disk (1) includes a drawing bottom disk (13) integrally connected with the draw bar (11) and a silica gel suction cushion (14), and the drawing bottom disk (13) is embedded in the silica gel suction cushion (14) to form a suction disk body.

Preferably, a through hole is formed on a circumferential edge of the drawing bottom disk (13), and the silica gel suction cushion (14) is passed through the through hole such that the circumferential edge of the drawing bottom disk (13) is embedded in the silica gel suction cushion.

Preferably, each of the soft rubber suction disk (1), the base (2), the pushing switch (41) and the driving slide cover (5) has a square shape or has a circular shape.

Preferably, an annular boss (15) for limiting a position of the return spring (3) is provided on a back surface of the soft rubber suction disk (1) and is around the draw bar (11).

Preferably, the driving slide cover (5) is provided with movement direction marks indicating the adsorption or release state, the movement direction mark indicating the adsorption state is the same as the downwardly inclined direction of the inclined step (43), while the movement direction mark indicating the release state is opposite to the downwardly inclined direction of the inclined step (43).

Preferably, a notch (47) is formed on a side wall corresponded to the lower end supporting surface (46) of the inclined step (43), to facilitate pushing the pushing pin shaft (12) such that it is mounted in the central guiding hole (21).

Compared with the prior art, in the suction disk structure according to the present application, since an inclined step pushing type driving device is employed, the pushing switch is driven to slide back and forth in the radial direction under the action of the driving slide cover, it is easy for the pin shaft at the end of the draw bar to be pushed up and down by the inclined steps at the center of the suction disk, the pin shaft is moved up and down along the inclined steps and can be stopped on the upper and lower end supporting surfaces of the inclined steps, respectively. Thereby the draw bar is driven to rise and fall to drive the soft rubber suction disk to be in the adsorption state and the release state. It is easy to push the pushing switch until it is in the self-locking state. At the same time, the base may serve as not only a back support for the soft rubber suction disk, but also as a sliding seat for the pushing switch. The base may also serve as a shell of the main body of the suction disk. The appearance of the entire suction disk may have various shapes, for example, a square shape, a circular shape, an oval shape or a polygon shape. Thereby, with such a suction disk, the installation environment becomes tidy, beautiful and generous, the adsorption force is improved, the adsorption effect is stable, the hanging article will not be easily fall off, the operation is more simple and easier, and the structure is simple and beautiful.

BRIEF DESCRIPTION OF THE DRAWINGS

FIG. 5 is a sectional view along the direction A-A of FIG. 1;
FIG. 6 is a sectional view along the direction B-B of FIG. 1;
FIG. 7 is a front view of the suction disk according to the present application, with the soft rubber suction disk being in a release state;
FIG. 8 is a front view showing the relationship between the pushing switch and the pin shaft when the soft rubber suction disk of the suction disk according to the present application is in a release state;
FIG. 9 is a sectional view along the direction C-C of FIG. 8;
FIG. 15 is a top view of FIG. 13;
FIG. 16 is a sectional view along the direction E-E of FIG. 15;
FIG. 17 is a bottom view of FIG. 13;
FIG. 18 is a perspective view of the pushing switch of the suction disk according to the present application;
FIG. 31 is a front view of the driving slide cover in the suction disk according to the present application;
FIG. 32 is a left view of FIG. 31;
FIG. 33 is a top view of FIG. 31;
FIG. 34 is a sectional view along the direction J-J of FIG. 33;
FIG. 35 is a sectional view along the direction K-K of FIG. 33;
FIG. 36 is a bottom view of FIG. 31;
FIG. 45 is a sectional view along the direction of FIG. 44;
FIG. 46 is a sectional view along the direction M-M of FIG. 44;
FIG. 47 is a front view showing the release state of the soft rubber suction disk when the shape of the suction disk according to the present application is square;
FIG. 48 is a front view showing the relationship between the pushing switch and the pin shaft in the release state of the soft rubber suction disk when the shape of the suction disk according to the present application is square;
FIG. 49 is a sectional view along the direction N-N of FIG. 48;
FIG. 50 is a front view showing the adsorption state of the soft rubber suction disk when the shape of the suction disk according to the present application is square;
FIG. 51 is a front view showing the relationship between the pushing switch and the pin shaft in the adsorption state of the soft rubber suction disk when the shape of the suction disk according to the present application is square;
FIG. 52 is a sectional view along the direction O-O of FIG. 51;

FIG. 53 is a front view of the pushing switch when the shape of the suction disk according to the present application is square;

FIG. 54 is a left view of FIG. 53;

FIG. 66 is a front view of the soft rubber suction disk when the shape of the suction disk according to the present application is square;

FIG. 67 is a left view of FIG. 66;

FIG. 68 is a top view of FIG. 66;

FIG. 69 is a sectional view along the direction S-S of FIG. 68;

FIG. 70 is a sectional view along the direction T-T of FIG. 68;

FIG. 71 is a bottom view of FIG. 66;

DETAILED DESCRIPTION OF THE INVENTION

In order that technical solutions according to the present application can be better understood by those skilled in the art, hereinafter, the technical solutions will be described in conjunction with embodiments.

Figures 1, 2:
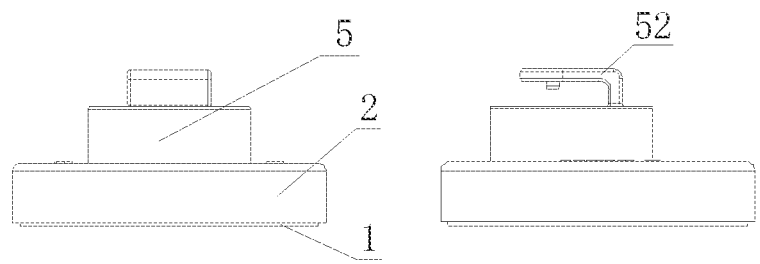
FIG. 1 is a front view of the suction disk according to the present application.
FIG. 2 is a left view of FIG. 1.
Figure 3:
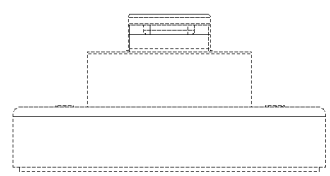
FIG. 3 is a back view of FIG. 1.
Figure 4:
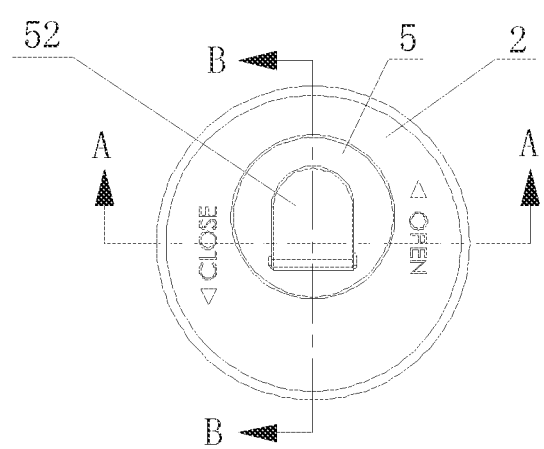
FIG. 4 is a top view of FIG. 1.
Figure 10:
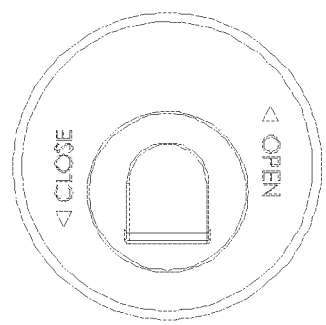
FIG. 10 is a front view of the suction disk according to the present application, with the soft rubber suction disk being in an adsorption state.
Figures 11, 12:
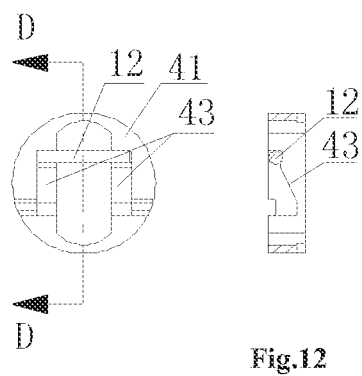
FIG. 11 is a front view showing the relationship between the pushing switch and the pin shaft when the soft rubber suction disk of the suction disk according to the present application is in an adsorption state.
FIG. 12 is a sectional view along the direction D-D of FIG. 11.
Figure 13:
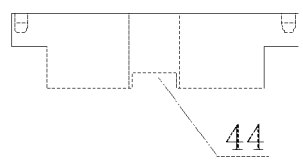
FIG. 13 is a front view of the pushing switch of the suction disk according to the present application.
Figure 14:
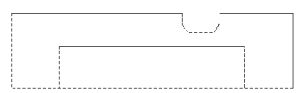
FIG. 14 is a left view of FIG. 13.
Figure 19:
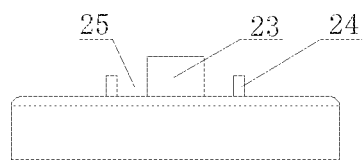
FIG. 19 is a front view of the base of the suction disk according to the present application.
Figure 20:
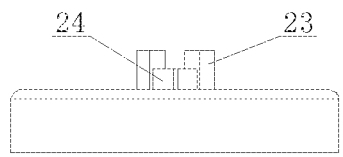
FIG. 20 is a left view of FIG. 19.
Figure 21:
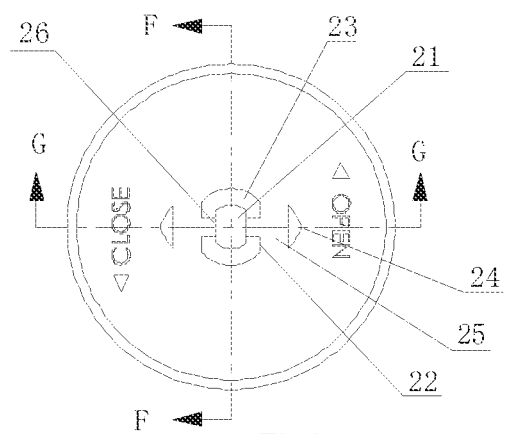
FIG. 21 is a top view of FIG. 19.
Figures 22, 23:
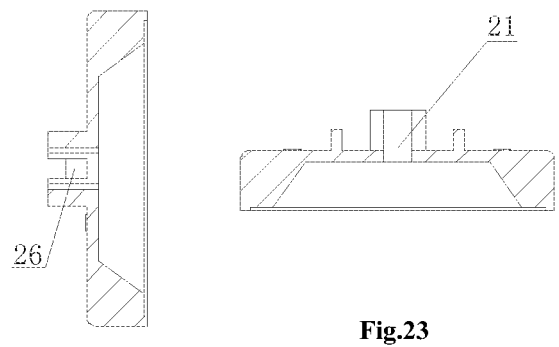
FIG. 22 is a sectional view along the direction F-F of FIG. 21.
FIG. 23 is a sectional view along the direction G-G of FIG. 21.
Figure 24:
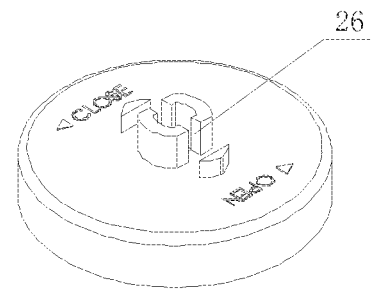
FIG. 24 is a perspective view of the base in the suction disk according to the present application.
Figures 25, 26:
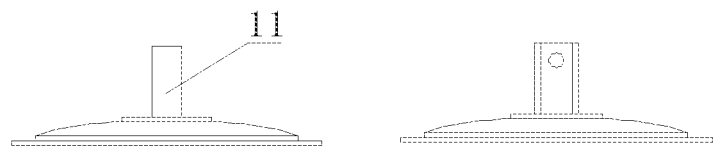
FIG. 25 is a front view of the soft rubber suction disk in the suction disk according to the present application.
FIG. 26 is a left view of FIG. 25.
Figures 27, 28:
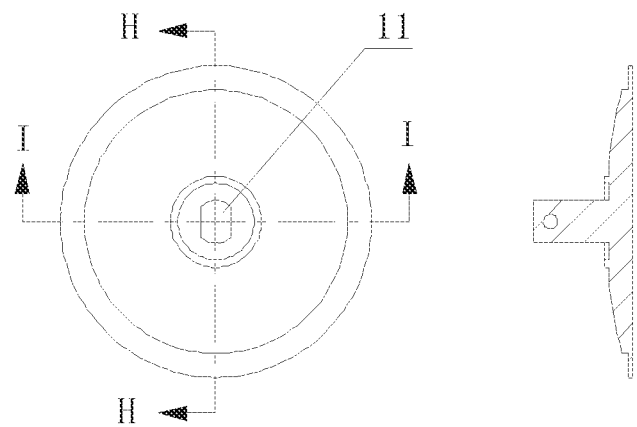
FIG. 27 is a top view of FIG. 25.
FIG. 28 is a sectional view along the direction H-H of FIG. 27.
Figures 29, 30:
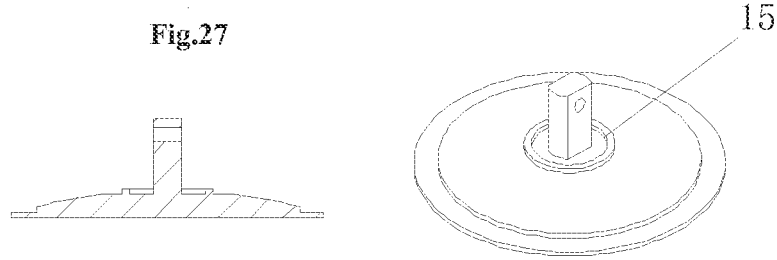
FIG. 29 is a sectional view along the direction I-I of FIG. 27.
FIG. 30 is a perspective view of the soft rubber suction disk in the suction disk according to the present application.
Figure 37:
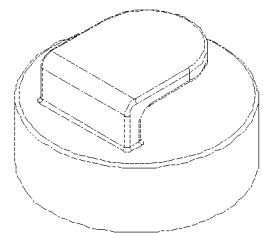
FIG. 37 is a perspective view of the driving slide cover in the suction disk according to the present application.
Figure 38:
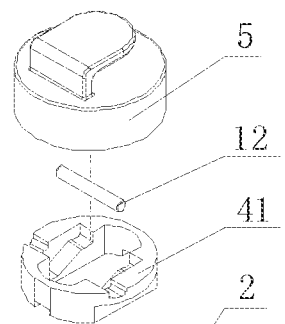
FIG. 38 is a perspective view of the suction disk of the present application.
Figure 38:
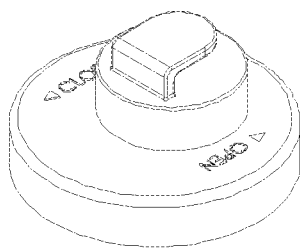
Figure 39:
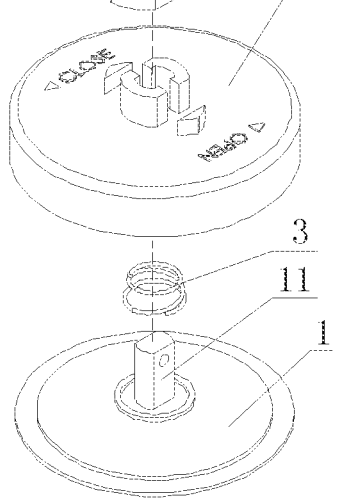
FIG. 39 is an exploded view of the installing structure of the suction disk according to the present application.
Figure 40:
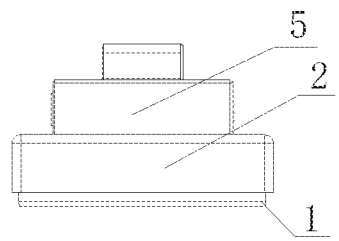
FIG. 40 is a front view showing that the shape of the suction disk according to the present application is square.
Figure 41:
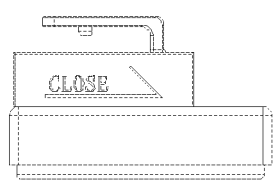
FIG. 41 is a left view of FIG. 40.
Figure 42:
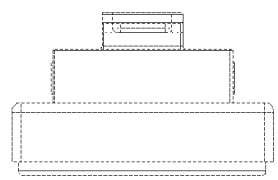
FIG. 42 is a back view of FIG. 40.
Figure 43:
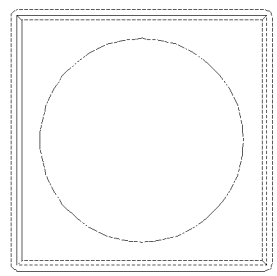
FIG. 43 is a bottom view of FIG. 40.
Figure 44:
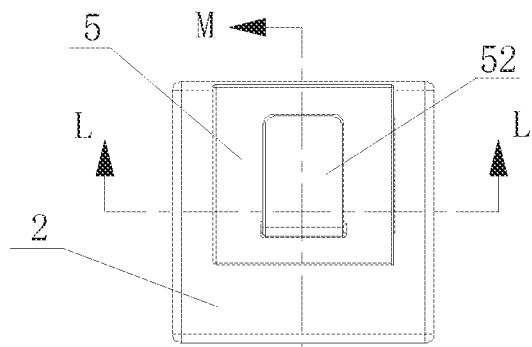
FIG. 44 is a top view of FIG. 40.
Figures 55, 56:
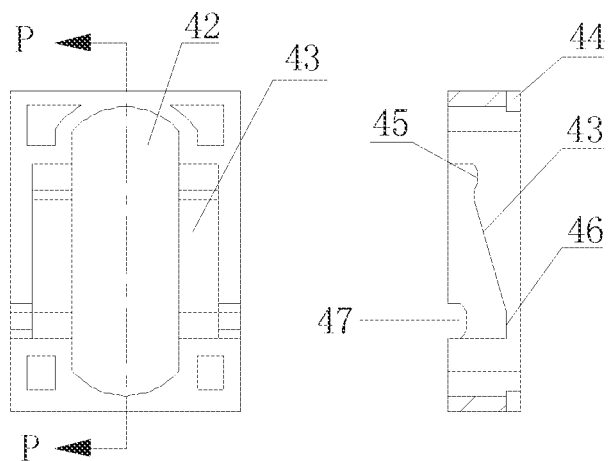
FIG. 55 is a top view of FIG. 53.
FIG. 56 is a sectional view along the direction P-P of FIG. 55.
Figures 57, 58:
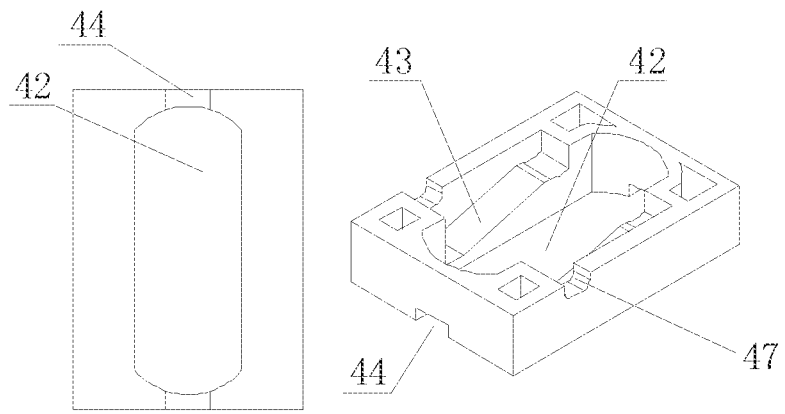
FIG. 57 is a bottom view of FIG. 53.
FIG. 58 is a perspective view of the pushing switch when the shape of the suction disk according to the present application is square.
Figure 59:
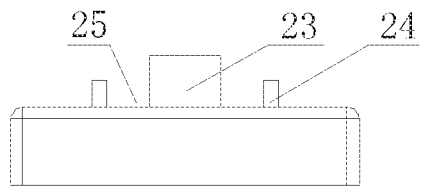
FIG. 59 is a front view of the base when the shape of the suction disk according to the present application is square.
Figure 60:
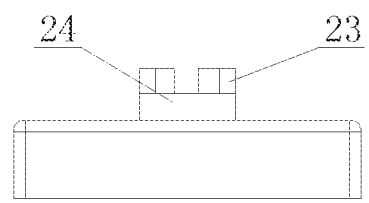
FIG. 60 is a left view of FIG. 59.
Figures 61, 62:
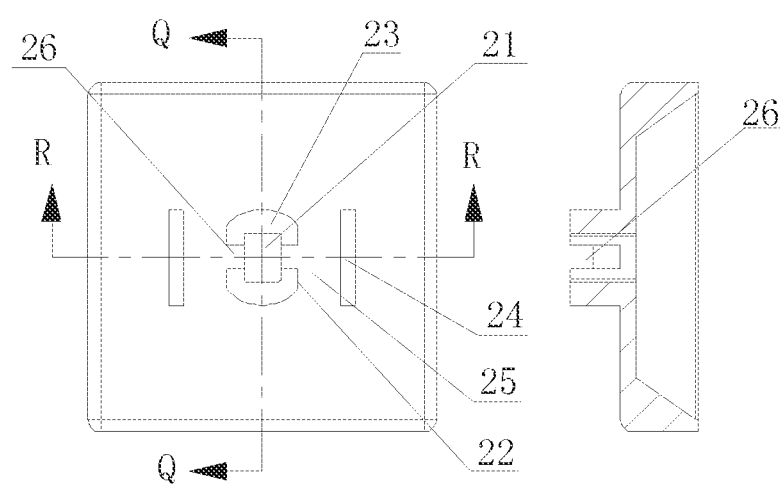
FIG. 61 is a top view of FIG. 59.
FIG. 62 is a sectional view along the direction Q-Q of FIG. 61.
Figure 63:
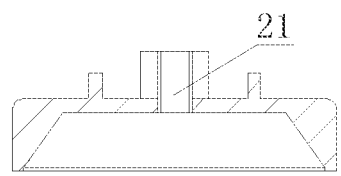
FIG. 63 is a sectional view along the direction R-R of FIG. 61.
Figure 64:
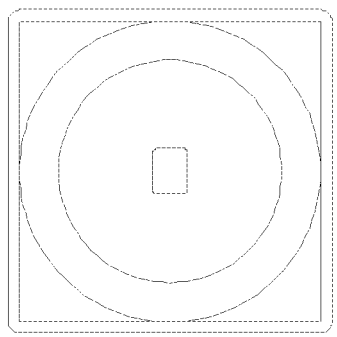
FIG. 64 is a bottom view of FIG. 59.
Figure 65:
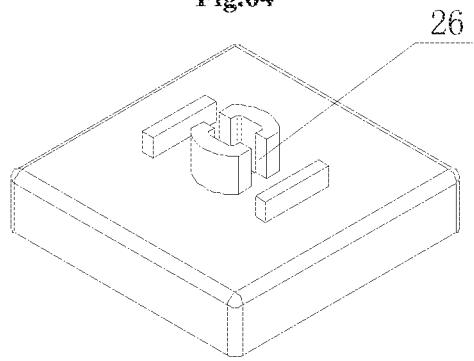
FIG. 65 is a perspective view of the base when the shape of the suction disk according to the present application is square.
Figures 72, 73:
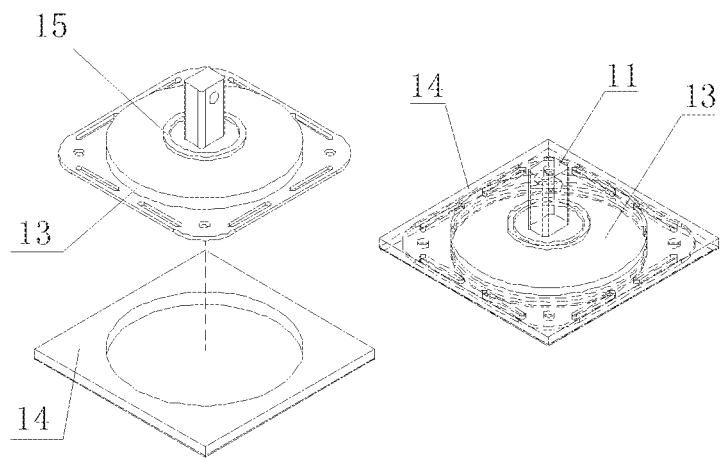
FIG. 72 is an exploded view of the installing structure of the soft rubber suction disk when the shape of the suction disk according to the present application is square.
FIG. 73 is a perspective view of the soft rubber suction disk when the shape of the suction disk according to the present application is square.
Figures 74, 75:
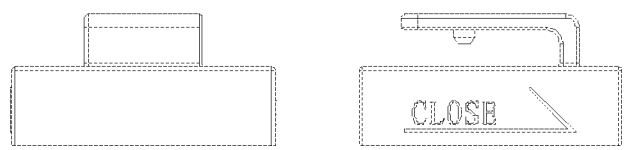
FIG. 74 is a front view of the driving slide cover when the shape of the suction disk according to the present application is square.
FIG. 75 is a left view of FIG. 74.
Figures 76, 77:
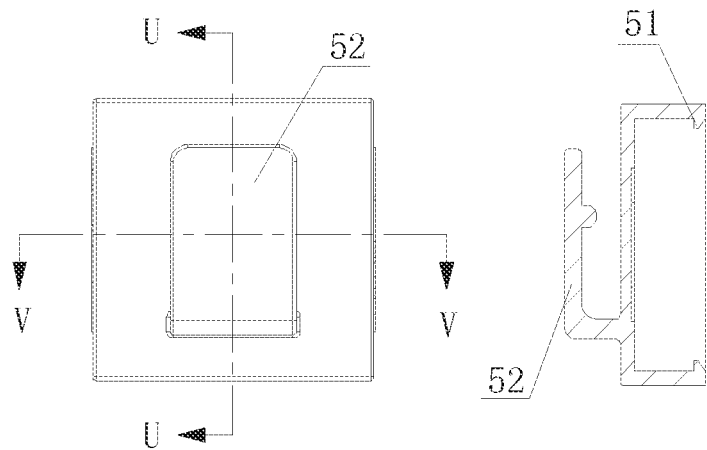
FIG. 76 is a top view of FIG. 74.
FIG. 77 is a sectional view along the direction U-U of FIG. 76.
Figures 78, 79:
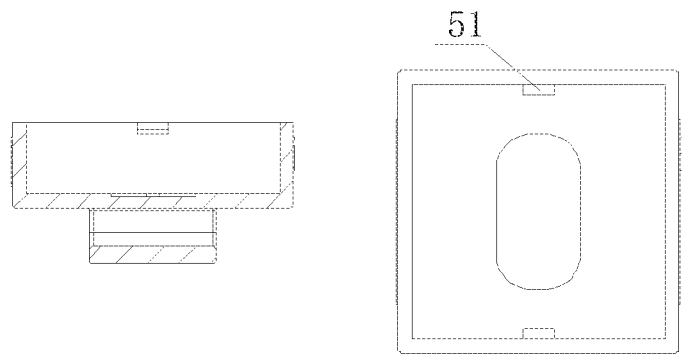
FIG. 78 is a sectional view along the direction V-V of FIG. 76.
FIG. 79 is a bottom view of FIG. 74.
Figure 80:
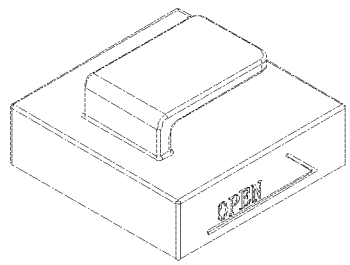
FIG. 80 is a perspective view of the driving slide cover when the shape of the suction disk according to the present application is square.
Figure 81:
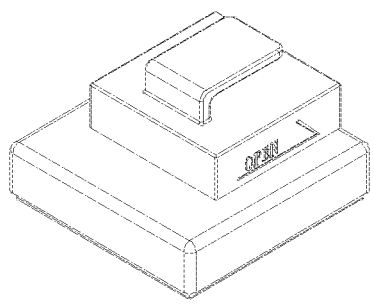
FIG. 81 is a perspective view when the shape of the suction disk according to the present application is square.
Figure 82:
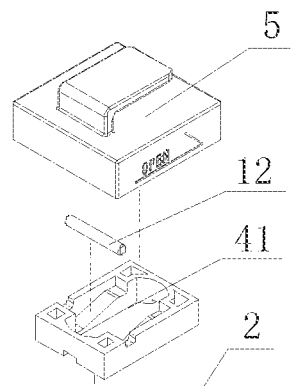
FIG. 82 is an exploded view of the installing structure when the shape of the suction disk according to the present application is square.
Figure 82:
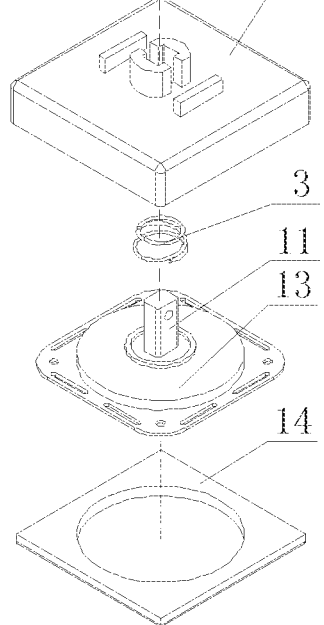

As shown in FIGS. 1 to 82, a suction disk according to an embodiment of the present application includes: a soft rubber suction disk 1 with a draw bar 11, a base 2 mounted on the back face of the soft rubber suction disk 1, and a return spring 3 located between the soft rubber suction disk 1 and the base 2. An end of the draw bar 11 is provided with a pin shaft 12 radially extended towards two sides of the draw bar. The suction disk further includes a driving device 4 for driving the draw bar 11 to rise and fall by pushing the pin shaft 12. The center of the base 2 has a central guiding hole 21 for guiding the draw bar 11 to move axially. A guiding column 23 having symmetrical guiding planes 22 at two sides of the guiding column and a pair of symmetrical position-limiting guiding flanges 24 are upwardly protruded around the central guiding hole 21, forming guiding grooves 25 between the guiding planes 22 and the position-limiting guiding flanges 24. The guiding column 23 further has a pin shaft rise-fall guiding groove 26 that is perpendicular to the symmetrical guiding planes 22 at two sides of the guiding column and extended along the axial direction. Two ends of the pin shaft 12 are hidden in the pin shaft rise-fall guiding groove 26. The driving device 4 includes a pushing switch 41 mounted on the base 2 and a driving slide cover 5 connected with the pushing switch 41 and having a supporting member. The center of the pushing switch 41 has an elongate guiding hole 42, and each of two symmetrical sides of the elongate guiding hole 42 is provided with an inclined step 43 with an upper end supporting surface and a lower end supporting surface. The pushing switch 41 is sleeved on the guiding column 23 through the elongate guiding hole 42 in a slideable cooperation manner such that the pushing switch 41 is guided in the guiding groove 25. The draw bar 11 is extended through the central guiding hole 21 of the base 2 and the center of the pushing switch 41 such that two ends of the pin shaft 12 are simultaneously hidden in the inclined steps 43. As the pushing switch 41 is driven by the driving slide cover 5 to slide back and forth in a radial direction, the pin shaft 12 is moved up and down along the inclined step 43 and can be stopped on the upper and lower end supporting surfaces of the inclined step, respectively thereby driving the draw bar 11 to rise and fall to drive the soft rubber suction disk 1, to thereby achieving an adsorption state and a release state.

An annular boss 15 for limiting the position of the return spring 3 is provided on the back surface of the soft rubber suction disk 1 and is around the draw bar 11.

A notch 47 is formed on the side wall corresponded to the lower end supporting surface of the inclined step 43, to facilitate pushing the pin shaft 12 such that it is mounted in the central guiding hole 21.

The driving slide cover 5 is provided with movement direction marks indicating the adsorption or release state, and the movement direction mark indicating the adsorption state is the same as the downwardly inclined direction of the inclined step 43, while the movement direction mark indicating the release state is opposite to the downwardly inclined direction of the inclined step 43.

In the present embodiment, the pin shaft 12 may be implanted after an end of the draw bar 11 is provided with a pin hole. The draw bar 11 may be a circular, square or polygon column, and the center of the base 2 is formed with a corresponding square or polygon central guiding hole 21 to limit the draw bar 11 such that it can only slide in the axial direction, which can reduce the failure caused by the rotation displacement of the draw bar 11 in the process that the pin shaft 12 is moved up and down along the inclined step 43 by the radial back and forth movement of the pushing switch 41. The pushing stroke of the pushing switch 41 should meet the requirement of the movement stroke of the pin shaft 12 between the two ends of the inclined step 43. While heights of the two end supporting surfaces of the inclined step 43 and height difference between the two end supporting surfaces should simultaneously meet that the soft rubber suction disk 1 has the largest adsorption force and the draw bar 11 has the largest rise-fall stroke. The gentler the inclined step 43 is, the longer the stroke of the pushing switch 41 is, and thus less effort is taken, however, the base 2 would become larger. Therefore the inclination angle of the inclined step 43 should be suitably selected. Generally, it is preferable that the inclination angle is between 14 degree and 18 degree. The internal cavity of the base 2 facing to the soft rubber suction disk 1 may be configured into a horn-shaped conical surface which is corresponded to the shape of the back face of the soft rubber suction disk 1 in the adsorption state, to support the back face of the soft rubber suction disk 1 in the adsorption state, thereby stabilizing the fastness of the suction disk.

As shown in FIGS. 5-6, 13-18, 31-36, 45-46, 53-58 and 74-79, one of the preferred embodiments of the present application is that: the front and back ends of the bottom surface of the pushing switch 41 are formed with the same recess 44, the internal wall of each of the front and back bottom edges of the driving slide cover 5 has a clasp 51, and the driving slide cover 5 is connected with the pushing switch 41 by the snap fit self-locking cooperation of the clasp 51 and the recess 44. In the present embodiment, the clasps 51 are a pair of L-shaped outward barbs, and the extending direction of the recess 44 is the same as the sliding directions of the driving slide cover 5 and the pushing switch 41, and it is preferable that the width of the recess 44 and the width of the clasp 51 are configured to be just suitable for the clasp to be hidden in the recess and play a position-limiting action, such that the driving slide cover 5 and the pushing switch 41 are firmly connected. Alternatively, the recess may be replaced by a notch.

As shown in FIGS. 16-18 and 56-58, a second preferred embodiment of the present application is that: in the upper and lower end supporting surfaces of the inclined step 43, the upper end supporting surface 45 is a concave surface, and the lower end supporting surface 46 is a flat surface. In the present embodiment, the upper end supporting surface 45 is configured to be a concave surface such that the pin shaft 12 will not slip off when it is hidden in the concave surfaces, thereby maintaining a better adsorption force of the suction disk.

As shown in FIGS. 1-7, 31-37, 41-47 and 74-80, a third preferred embodiment of the present application is that: the supporting member of the driving slide cover 5 is configured as a flat square hook 52 bent upwardly. In the present embodiment, the flat square hook 52 is an upward L-shaped hook, the flat square shape facilitates pushing the driving slide cover 5, and it is more beautiful and generous.

As shown in FIGS. 66-73, a fourth preferred embodiment of the present application is that: the soft rubber suction disk 1 includes a drawing bottom disk 13 integrally connected with the draw bar 11 and a silica gel suction cushion 14. The drawing bottom disk 13 is embedded in the silica gel suction cushion 14 to form a suction disk body. Through holes are formed on the circumferential edge of the drawing bottom disk 13, and the silica gel suction cushion 14 is passed through the through holes such that the circumferential edge of the drawing bottom disk 13 is embedded in the silica gel suction cushion. In the present embodiment, the drawing bottom disk 13 may be made of a plastic material; and the draw bar 11 may be made of a metal or plastic material, and may be injection molded together with the drawing bottom disk 13, and then the silica gel suction cushion 14 is molded by casting such that the drawing bottom disk is embedded therein, forming a suction disk body, which makes the adsorption force of the suction disk more stable.

A fifth preferred embodiment of the present application is that: each of the soft rubber suction disk 1, the base 2, the pushing switch 41 and the driving slide cover 5 has a square or has a circular shape. In the present embodiment, as shown in FIGS. 1-39, each of the soft rubber suction disk 1, the base 2, the pushing switch 41 and the driving slide cover 5 has a circular shape. As shown in FIGS. 40-82, each of the soft rubber suction disk 1, the base 2, the pushing switch 41 and the driving slide cover 5 has a square shape. The above components may have an oval or a polygon shape, etc. A suction disk having all of the above shapes can make a tidy, beautiful and generous installing environment.

In the present application, with an inclined step pushing type driving device, the pushing switch 41 is driven to slide back and forth in the radial direction under the action of the driving slide cover 5, it is easy for the pin shaft 12 at the end of the draw bar 11 to be pushed up and down by the inclined steps 43 at the center of the suction disk, the pin shaft 12 is moved up and down along the inclined steps 43 and can be stopped on the upper and lower end supporting surfaces of the inclined steps, respectively Thereby the draw bar 11 is driven to rise and fail to drive the soft rubber suction disk 1 to be in the adsorption state and the release state. It is easy to push the pushing switch 41 to the end to be in the self-locking state. At the same time, the base 2 may serve as not only a back support for the soft rubber suction disk but also a sliding seat for the pushing switch 41. The base may also serve as a shell of the main body of the suction disk. The entire suction disk may have various shapes, for example, a square shape, a circular shape, an oval shape or a polygon shape. Thereby, with such a suction disk, the installation environment becomes tidy, beautiful and generous, the adsorption force is improved, the adsorption effect is stable, the hanging article will not be easily fall off, the operation is more simple and easier, and the structure is simple and beautiful.

The person skilled in the art can achieve or implement the present application based on the above description of the embodiments, it is apparent for the person skilled in the art to make many modifications to the embodiments. The general principle defined herein may be achieved in other embodiments without departing from the spirit or scope of the present application. Therefore, the present application is not limited to the embodiments illustrated herein, but should be defined by the broadest scope consistent with the principle and novel features disclosed herein.

The invention claimed is:

1. A suction disk structure, comprising:
a soft rubber suction disk with a draw bar, a base mounted on a back face of the soft rubber suction disk and a return spring located between the soft rubber suction disk and the base, an end of the draw bar is provided with a pin shaft radially extended towards two sides of the draw bar, and the suction disk further comprises a driving device for driving the draw bar to rise and fall by pushing the pin shaft, wherein
a center of the base has a central guiding hole for guiding the draw bar to move axially; a guiding column having symmetrical guiding planes at two sides of the guiding column and a pair of symmetrical position-limiting guiding flanges are upwardly protruded around the central guiding hole, forming guiding grooves between the guiding planes and the position-limiting guiding flanges; the guiding column further has a pin shaft rise-fall guiding groove that is perpendicular to the symmetrical guiding planes at two sides of the guiding column and extended along the axial direction, and two ends of the pin shaft are hidden in the pin shaft rise-fall guiding groove;

the driving device comprises a pushing switch mounted on the base and a driving slide cover connected with the pushing switch and having a supporting member; the center of the pushing switch has an elongate guiding hole, and each of two symmetrical sides of the elongate guiding hole is provided with an inclined step with an upper end supporting surface and a lower end supporting surface; and the pushing switch is sleeved on the guiding column through the elongate guiding hole in a slidable cooperation manner such that the pushing switch is guided in the guiding groove; and the draw bar is extended through the central guiding hole of the base and a center of the pushing switch such that two ends of the pin shaft are simultaneously hidden in the inclined steps; as the pushing switch is driven by the driving slide cover to slide back and forth in a radial direction, the pin shaft is moved up and down along the inclined step and can be stopped on the upper and lower end supporting surfaces of the inclined step, respectively, thereby driving the draw bar to rise and fall to drive the soft rubber suction disk, to thereby achieving an adsorption state and a release state.

2. The suction disk structure according to claim 1, wherein each of a front end and a back end of a bottom surface of the pushing switch is formed with a recess, an internal wall of each of front and back bottom edges of the driving slide cover is provided with a clasp, and the driving slide cover is connected with the pushing switch by self-locking snap fit of the clasp and the recess.

3. The suction disk structure according to claim 1, wherein in the upper and lower end supporting surfaces of the inclined step, the upper end supporting surface is a concave surface, and the lower end supporting surface is a flat surface.

4. The suction disk structure according to claim 1, wherein the supporting member of the driving slide cover is a flat square hook bent upwardly.

5. The suction disk structure according to claim 1, wherein the soft rubber suction disk comprises a drawing bottom disk integrally connected with the draw bar and a silica gel suction cushion, and the drawing bottom disk is embedded in the silica gel suction cushion to form a suction disk body.

6. The suction disk structure according to claim 5, wherein a through hole is formed on a circumferential edge of the drawing bottom disk, and the silica gel suction cushion is passed through the through hole such that the circumferential edge of the drawing bottom disk is embedded in the silica gel suction cushion.

7. The suction disk structure according to claim 1, wherein each of the soft rubber suction disk, the base, the pushing switch and the driving slide cover has a circular shape.

8. The suction disk structure according to claim 1, wherein an annular boss for limiting a position of the return spring is provided on a back surface of the soft rubber suction disk and is around the draw bar.

9. The suction disk structure according to claim 1, wherein the driving slide cover is provided with movement direction marks indicating the adsorption or release state, and wherein the movement direction mark indicating the adsorption state is the same as the downwardly inclined direction of the inclined step, while the movement direction mark indicating the release state is opposite to the downwardly inclined direction of the inclined step.

10. The suction disk structure according to claim 1, wherein a notch is formed on a side wall corresponded to the lower end supporting surface of the inclined step, to facilitate pushing the pushing pin shaft such that it is mounted in the central guiding hole.

* * * * *